May 8, 1934.　　　　　F. C. FRANK　　　　　1,957,636
BRAKE
Filed Dec. 21, 1931

INVENTOR.
FREDERICK C. FRANK
BY *C. H. Fowler*
ATTORNEYS.

Patented May 8, 1934

1,957,636

UNITED STATES PATENT OFFICE 1,957,636

BRAKE

Frederick C. Frank, South Bend, Ind., assignor to Bendix Aviation Corporation, South Bend, Ind., a corporation of Delaware Application December 21, 1931, Serial No. 582,447

7 Claims. (Cl. 188—78)

This invention relates to brakes, and more particularly to internal expanding brakes.

Broadly, the invention comprehends a brake structure including means for transmitting the reaction of the input force on the primary shoe to the anchor to counterbalance, to the extent of the input pressure, the bending moment of the anchor caused by the braking force applied to the secondary shoe.

The invention also comprehends a brake structure having means for guiding the toe of the primary shoe, so that this shoe may be held in definite alignment with the secondary shoe, and means for locating the primary shoe upon release of the applied force.

An object of the invention is to provide a brake structure including means for transmitting the input force on the friction element to the anchor to counterbalance, to the extent of the input pressure, the bending moment of the anchor caused by the braking force of the friction element.

Another object of the invention is to provide a brake structure having means for guiding the toe of the friction element.

A further object of the invention is to provide a brake structure including an auxiliary means for supporting the operating member, means for guiding the friction element, and means for definitely locating the friction element upon release of the brake.

A feature of the invention is an anchor, an operating shaft arranged in parallel relation thereto and means connecting the anchor to the operating shaft.

Another feature of the invention is an anchor, an operating shaft arranged parallel thereto and spaced members connecting the anchor to the operating shaft extending beyond the shaft to provide a guide for the friction element, and a stop supported by the spaced members for definitely locating the friction element upon release of the brake.

The above objects and features of the invention including various details of structure will become apparent from the following description taken in connection with the drawing forming a part of this application, and in which.

Figure 1:
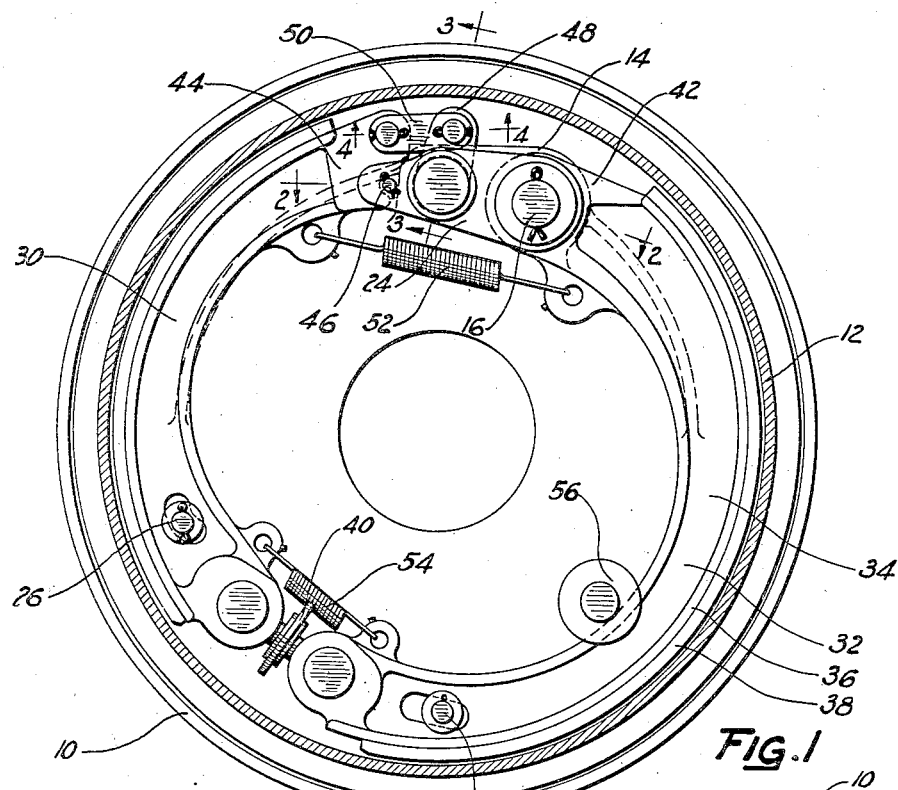
Figure 1 is a vertical sectional view of a brake taken just back of the head of the drum illustrating the friction elements in side elevation and showing the invention as applied.
Figure 2:
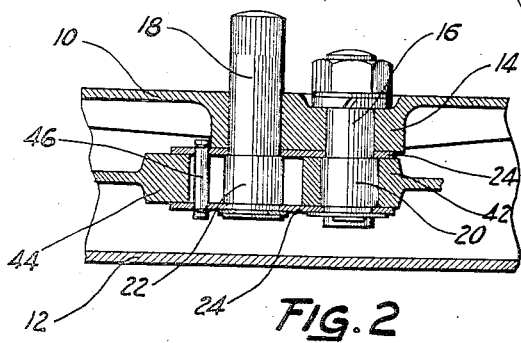
Figure 2 is a sectional view substantially on line 2—2, Figure 1.
Figure 3:
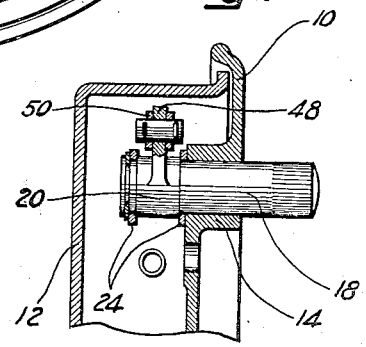
Figure 3 is a sectional view substantially on line 3—3, Figure 1.
Figure 4:
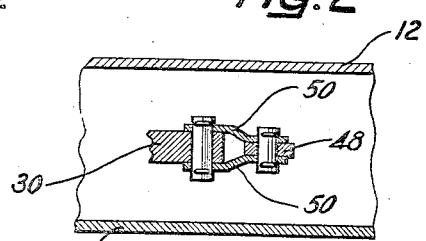
Figure 4 is a sectional view substantially on line 4—4, Figure 1.

Referring to the drawing for more specific details of the invention, 10 represents a fixed support, such as the backing plate. The backing plate has associated therewith a rotatable drum 12. As shown, the backing plate is provided with a boss 14 supporting an anchor 16, and positioned for rotation in the boss is an operating shaft 18 arranged in parallel relation to the anchor.

A portion of the anchor 16 has an enlarged diameter as indicated at 20, and the operating shaft 18 has an enlarged portion as indicated at 22. Sleeved on the anchor 16 and the operating shaft 18 on the respective sides of the enlarged portions 20 and 22 are spaced plates 24, the object of which will be hereinafter explained.

Positioned on the backing plate are suitable steady rests 26 and 28, and positioned for movement on the steady rests is a friction element including a primary shoe 30 and a secondary shoe 32. Each of the shoes is of the conventional type including a web 34 supporting a rim 36 to which is secured a suitable lining 38 adaptable for cooperation with the drum.

The articulated ends of the shoes are connected by a suitable adjusting device indicated at 40. The anchored end 42 of the shoes is pivoted on the enlarged portion 20 on the anchor 16 between the plates 24, and the other end or movable end 44 is positioned between the plates 24 where it rests when the brake is in the released position against a suitable stop 46 positioned transversely with respect to the plates.

A lever 48 on the operating shaft 18 is pivotally connected by parallel links 50 to the movable end 44 of the shoe 30, and suitably connected to the shaft 18 is an operating means, not shown.

Connected between the primary shoe 30 and the secondary shoe 32 are return springs 52 and 54. These springs serve to return the shoes, when the brake is released against a retractor stop 56 and the stop 46 and to retain the shoes when in this position in proper spaced relation to the drum.

The most important factor of the invention is to be found in the unique means provided for counterbalancing the forces transmitted to the anchor. This particular means also provides an outboard bearing for the operating shaft, a guide for the friction element, and a stop for the friction element when the brake is in a released position.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising an anchor, friction means engaging the anchor, an operating shaft arranged in parallel relation to the anchor, and spaced members connecting the operating shaft to the anchor on opposite sides of the friction means.

2. A brake comprising an anchor, a shaft arranged in spaced parallel relation thereto, spaced members supported on the anchor and shaft, and a stop supported by the members.

3. A brake comprising a support, a fixed anchor thereon, a rotatable shaft arranged parallel to the anchor, spaced members connecting the anchor and the shaft, and a stop supported by the members.

4. A brake comprising an anchor provided with a portion having an enlarged diameter, an operating shaft having a portion provided with an enlarged diameter arranged in parallel relation to the enlarged portion on the anchor, plates sleeved on the anchor and operating shaft on the respective sides of the enlarged portions and a stop supported by the plates.

5. A brake comprising a support having a boss, an anchor on the boss, an operating shaft positioned for rotation in the boss in parallel relation to the anchor, an enlarged portion on the anchor, an enlarged portion on the operating shaft and plates sleeved on the anchor and operating member on the respective sides of the enlarged portions, and a transverse pin carried by the plates.

6. A brake comprising a support, a rotatable drum associated therewith, a boss on the support, an anchor on the boss, an operating shaft positioned for rotation in the boss, spaced plates sleeved on the anchor and operating shaft, a stop carried by the plates, a friction element having one end engaging the anchor, an arm on the operating shaft and a link connecting the arm to the other end of the friction element.

7. A brake comprising a fixed support, a rotatable drum associated therewith, an anchor on the support, an operating shaft arranged in parallel relation thereto, spaced plates sleeved on the anchor and operating shaft, a stop carried by the plates, a friction element adaptable for cooperation with the drum having one end engaging the anchor, a lever on the operating shaft and a link connecting the lever to the other end of the friction element.

FREDERICK C. FRANK.